Nov. 17, 1964   P. A. BEZZERIDES   3,157,234
WEEDER TOOL
Filed Jan. 15, 1962   3 Sheets-Sheet 1
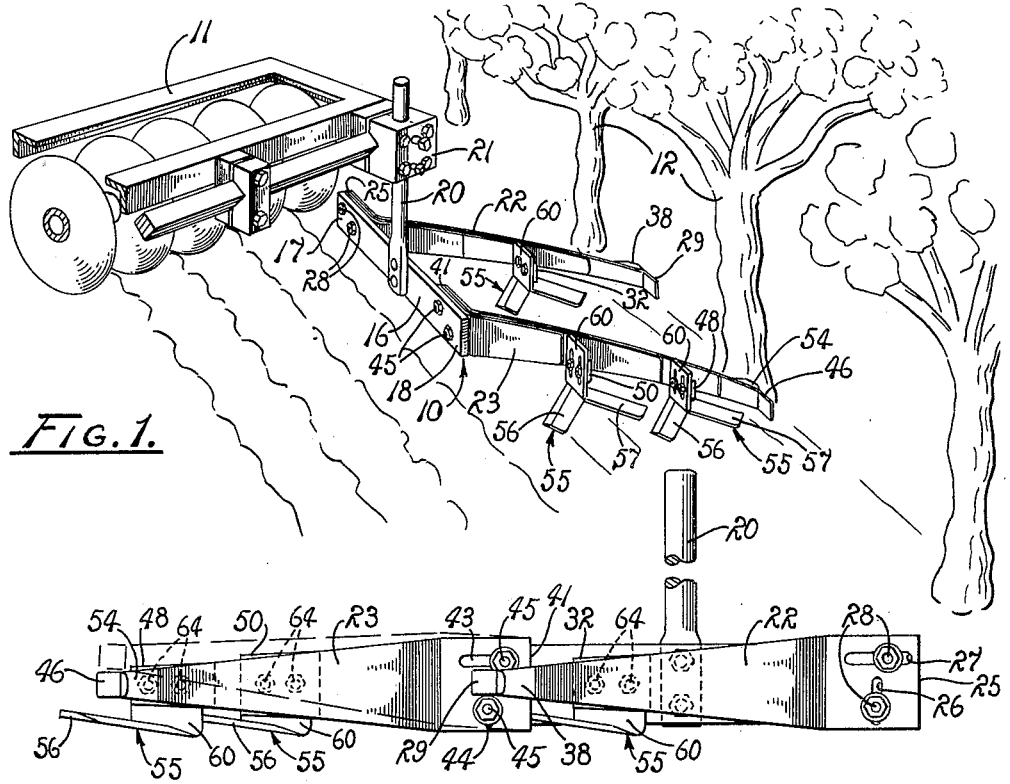
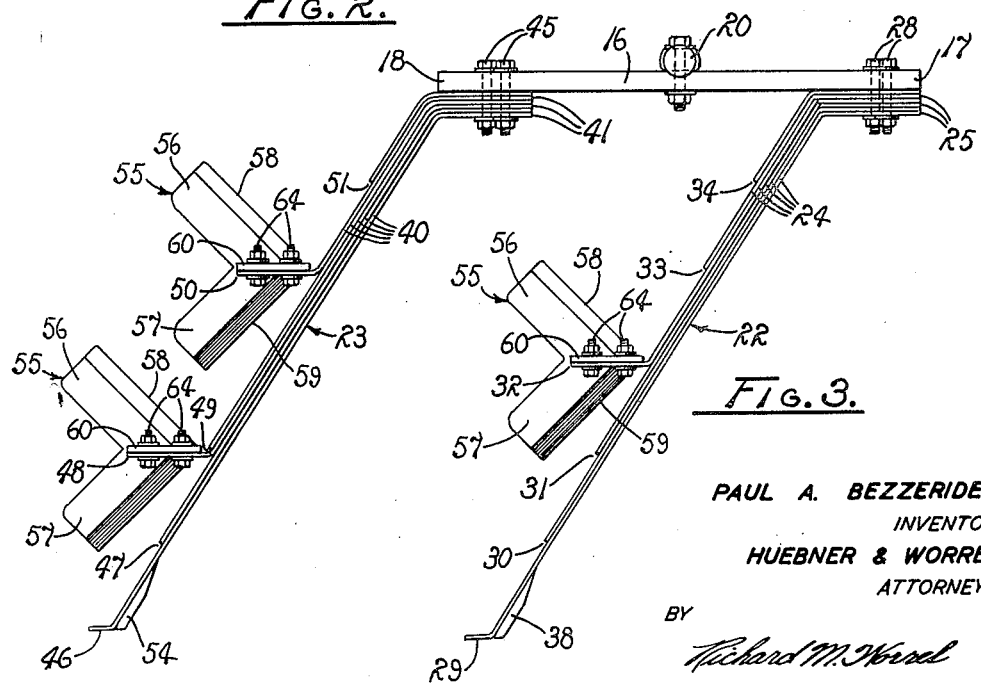
PAUL A. BEZZERIDES
INVENTOR
HUEBNER & WORREL
ATTORNEYS
BY Nov. 17, 1964  P. A. BEZZERIDES  3,157,234
WEEDER TOOL
Filed Jan. 15, 1962  3 Sheets-Sheet 2
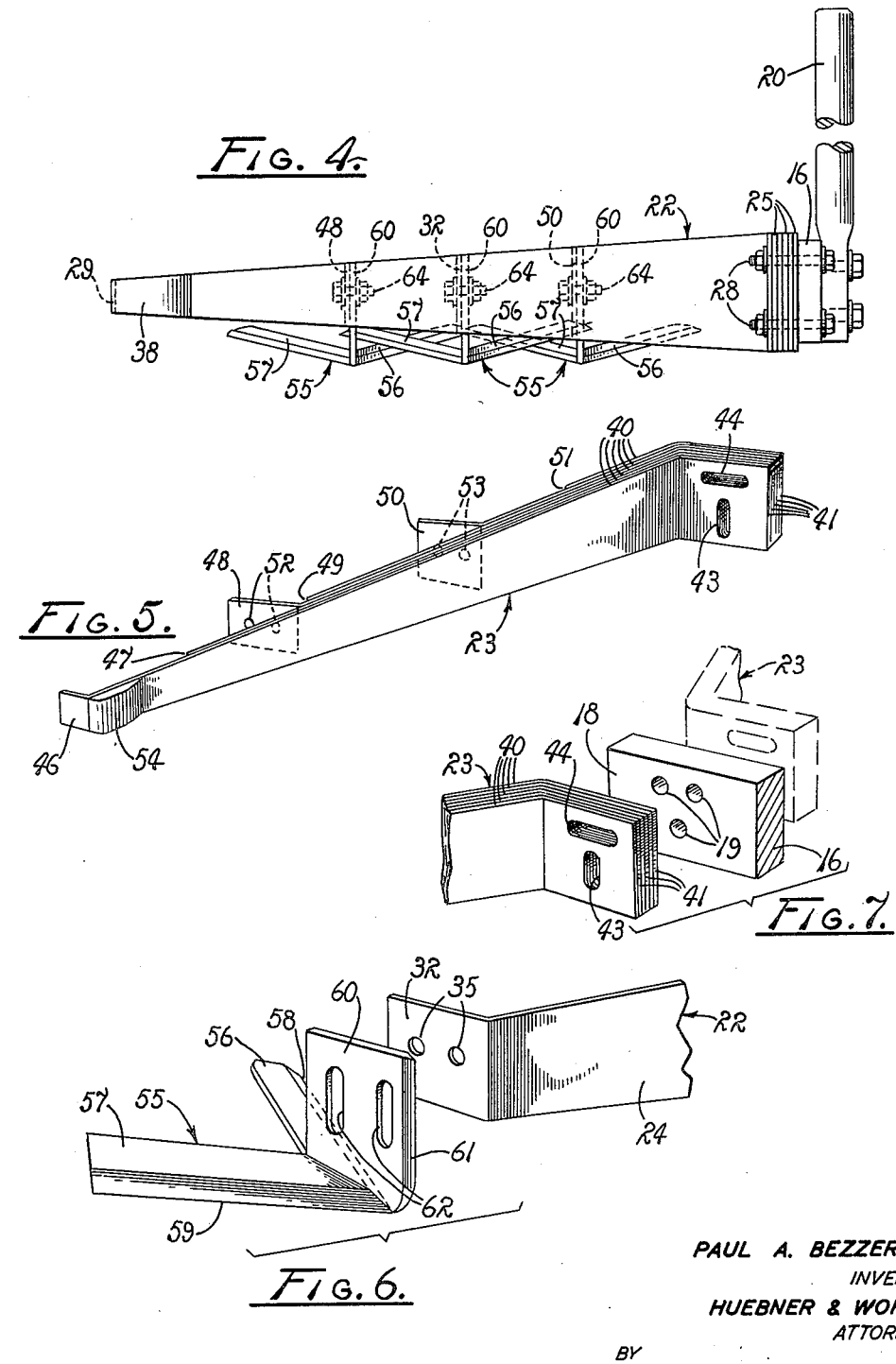
PAUL A. BEZZERIDES
INVENTOR
HUEBNER & WORREL
ATTORNEYS
BY
Richard M. Worrel

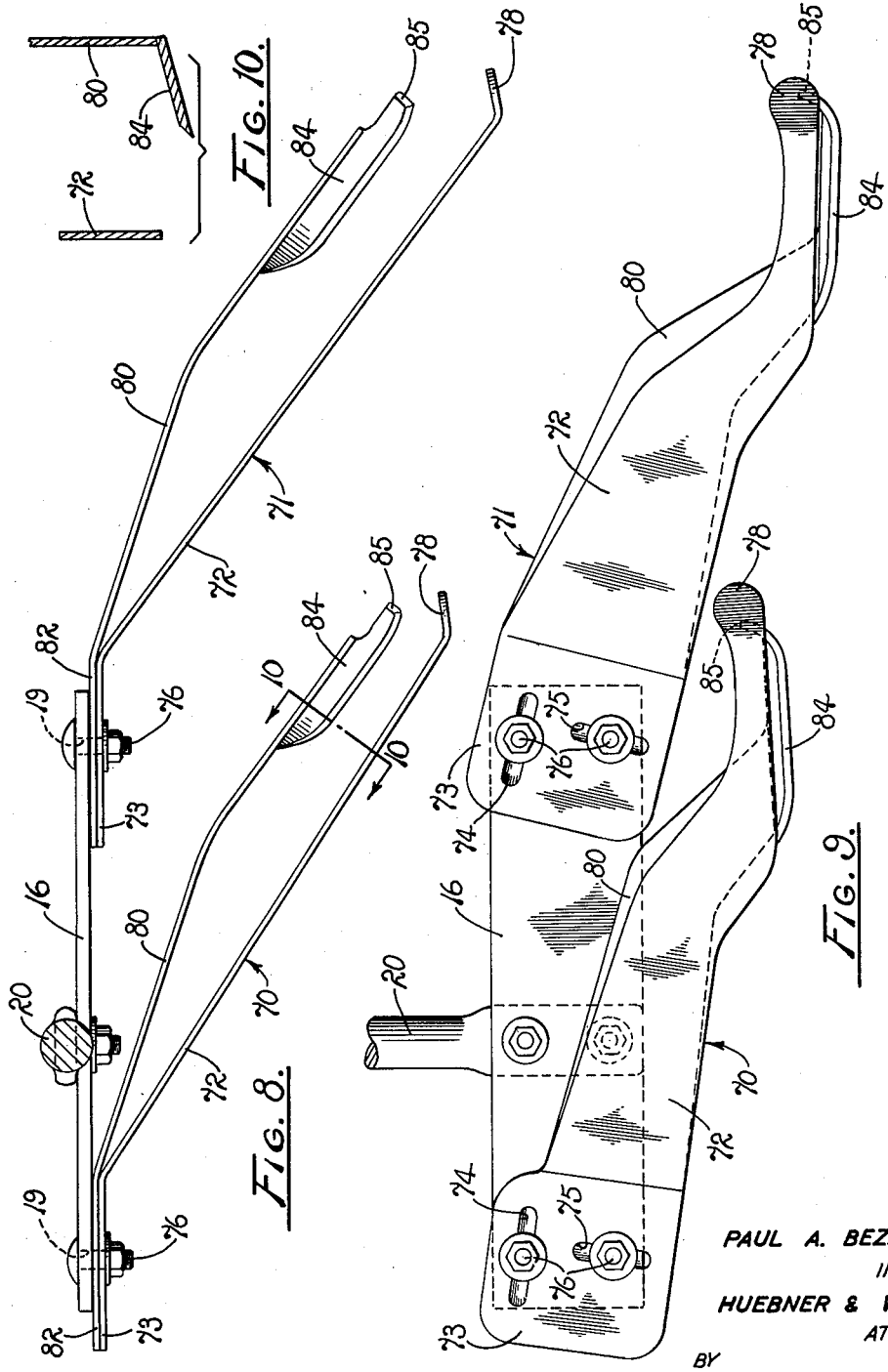

United States Patent Office 3,157,234
Patented Nov. 17, 1964

3,157,234
WEEDER TOOL
Paul A. Bezzerides, P.O. Box 1303, Orosi, Calif.
Filed Jan. 15, 1962, Ser. No. 166,146
13 Claims. (Cl. 172—142)

The present invention relates to a weeder tool for destroying weeds and other undesirable growth closely adjacent to growing plants. More particularly the present invention relates to a flexible weeder tool adapted slidably to pass such plants and wherein the flexible tool mounts substantially rigid planing blades which are effective to maintain the flexible tool in earth engagement.

Weeds growing in the furrows and on the ridges or beds between plants of row crops compete with the plants for soil nutrients and water, stifle plant growth, impede irrigation, interfere with harvest and processing of the harvested produce and blight the appearance of the field of crops. The most deleterious weeds are those which grow closely adjacent to the plants. The removal of such weeds must of course be accomplished without damage to the crop plants. Conventional methods for strong plants, such as grapevines, usually employ a system of cultivation and weed eradication commonly known as "French plowing." Such system utilizes rigid cultivating blades which are manually or automatically motivated in and out of a row of crops in a weaving pattern longitudinally of the rows. While this system is highly effective for use on row crops having strong mature plants it is not readily adapted for eradicating weeds in rows of tender easily damaged crops, such as lettuce, beets, tomatoes and the like. The blades usually penetrate too deeply into the earth and are therefore extremely difficult to control with sufficient preciseness to preclude damage to such tender crops. With automatic operation suitable controls are provided which are intended to be triggered by individual plants in the rows. If the triggering mechanism is sufficiently strong to remove all of the weeds then many of the more tender plants are destroyed along therewith. If the triggering mechanism is too sensitive then many undesirable weeds are missed. This problem is effectively solved by the flexible weeder implement disclosed in my co-pending application serial No. 25,920 filed May 2, 1960 entitled "Weeder," now abandoned. The structure of this co-pending application provides longitudinally substantially horizontally extended, transversely substantially vertical, flat blades of spring steel in edgeward earth scraping engagement. The blades flex longitudinally rearwardly incident to the forward draft of the implement through the soil and with deviations of the implement with regard to its normal straight path of travel, the blades are flexed rearwardly by engagement with the plants. The rearward flexing of the blades causes the soil ahead and transversely outwardly thereof to be compressed which action disturbs and agitates the soil surrounding the plants thereby to eradicate surface weeds between and around the rows of plants. The weeds removed thereby are necessarily not as firmly rooted as the plants. In relatively loose or sandy soils, which are easily disturbed, the weeder implement is normally positioned outwardly of the row of plants effectively to remove weeds within the rows by the aforementioned agitation of the soil therearound without physical contact of the weeder blades with the plants. However, when working in harder soils, it is necessary to position the implement closer to the plants so as to extend the outer tips within the row whereby the blades are further rearwardly flexed by plant engagement. However, frequently weeds are encountered which are sufficiently tough and resilient that the blades merely bend them over into ground engagement. As a result, the blades are lifted out of earth engagement to ride over the weeds or are flexed rearwardly therepast. Also, certain weeds are frequently encountered having root systems developed to such a degree as to preclude their removal by surface engaging tools. The instant structure therefore is intended to combine with, and to so improve, the structure of my co-pending application for effectively destroying substantially all the undesirable weeds in cultivated row crops without damage to the crops.

Accordingly, it is an object of the present invention to provide a weeder tool having a blade which is sufficiently resiliently flexible to slide past the plants and which is effective to destroy weeds in close proximity to the plants.

Another object is to provide a flexible weeder tool which is adapted to mount substantially rigid stabilizing blades thereon.

Another object is to provide a flexible weeder tool having stabilizing blades to maintain the tool in earth engagement.

Another object is to provide a flexible weeder tool having stabilizing blades which are effective to sever the roots of weeds beneath the flexible tool.

Another object is to provide such a weeder tool wherein the stabilizing blades are positioned out of plant engagement by the flexible blades.

Another object is to provide a flexible weeder tool wherein the flexibility of the blades is readily modified for adapting the tool to varied crops.

Other objects and advantages of the present invention will become more fully apparent in the subsequent description in the specification.

In the drawings:

FIG. 1 is a perspective of the weeder tool of the present invention mounted on a disc harrow, which is fragmentarily represented, and all shown in an illustrative environment including a row of growing crops.

FIG. 2 is a side elevation of the weeder observed from the right side.

FIG. 3 is a top plan view of the weeder tool.

FIG. 4 is a front elevation of the weeder tool.

FIG. 5 is a perspective of a weeder blade shown removed from the weeder tool of the present invention.

FIG. 6 is an exploded view of a rigid planing blade embodying the principles of the present invention shown removed from its mounting on the flexible blade.

FIG. 7 is an exploded fragmentary perspective of the weeder blade removed from a mounting beam and showing an inverted position of the blade in broken lines.

FIG. 8 is a top plan view of a second form of the weeder tool of the present invention.

FIG. 9 is a side elevation of the second form of FIG. 8.

FIG. 10 is a transverse vertical section through the scraping and auxiliary blades of the present invention taken on line 10—10 of FIG. 8.

Referring more particularly to the drawings, an earth working weeder tool embodying the principles of the present invention is indicated generally at 10. The tool may be mounted on any suitable tractor, implement or other earth traversing vehicle, such as the disc harrow 11 of FIG. 1. It is frequently utilized with such a harrow in vineyard and other row-crop cultivation. For example, a series of plants 12 arranged in spaced relation in a row is shown in FIG. 1. The disc harrow is drawn along the row in a closely adjacent proximity thereto as surface roots and good cultivating practices permit. The tool of the present invention serves to weed the soil more closely adjacent to the row and between the plants in the row, as will subsequently become more fully apparent.

The weeder 10 includes a tool mounting beam 16 having opposite forward and rearward ends 17 and 18, respectively longitudinally aligned with the direction of travel of the cultivator between adjacent rows of the plants 12. A plurality of spaced transversely disposed apertures 19 are extended through each end of the beam for a purpose soon to become apparent. An elongated cylindrical shank 20 is rigidly connected to the mounting member 16 intermediate its ends in substantially vertically upwardly extended relation therefrom. The shank is adapted to be received within a suitable mounting bracket 21 on the cultivator thereby elevationally to position the beam relative to the ground.

A pair of spaced flexible mounting or weeder blades 22 and 23 are individually releasably connected to the forward and rearward ends of the mounting beam 16 in transversely outwardly extended relation therefrom. The forward blade 22 is preferably composed of a plurality of superimposed sheets or laminations 24 of spring steel material. The forward blade laminations include congruently related inner ends 25 adjustably bolted to the forward end 17 of the beam by way of a plurality of transversely aligned pairs of spaced, right-angularly related elongated slots 26 and 27. The slots are adjustably alignable with the apertures 19 in the forward end of the beam individually to receive bolts 28. The forward blade 22 tapers longitudinally of its length outwardly from the inner ends 25 of the laminations in obliquely rearwardly extended relation to terminate in an angulated outer end 29 disposed in substantially parallel relation to the beam 16. Each of the laminated sheets 24 successively terminate in inwardly spaced ends 30, 31, 32, 33 and 34. The end 32 is angularly rearwardly bent in substantially parallel relation to the outer end 29 and to the mounting beam 16. As shown in FIG. 6, the bent end 32 provides a pair of spaced holes 35 therethrough for a purpose soon to become apparent. A wear pad 38 of hardened metallic material is preferably disposed adjacent to the outer end 29 of the blade to provide a wear surface for engagement with the plants 12.

The rearward blade 23 is constructed somewhat similarly to the forward blade 22 and includes a plurality of laminated sheets 40 of spring steel having congruently related inner ends 41. The inner ends have a plurality of similar, aligned pairs of spaced, right-anguarly related, elongated slots 43 and 44 adjustably alignable with the apertures 19 in the rearward end of the mounting beam 16 for individually receiving a pair of bolts 45 therethrough. The rearward blade tapers longitudinally of its length outwardly therefrom to terminate in an outer angulated end portion 46 substantially aligned with the outer end 29 to the forward blade. The laminated sheets of the rearward blade also provide successively inwardly disposed end portions 47, 48, 49, 50 and 51 wherein the ends 48 and 50 are rearwardly angularly bent in substantially parallel relation to the bent end 32 of the forward flexible blade. As best shown in FIG. 5, each of the ends has a pair of mounting holes 52 and 53, respectively, therethrough. For reasons also subsequently to be explained, a wear pad 54 is similarly disposed adjacent to the outer end 46 of the rearward flexible blade. As best shown in FIG. 2, either or both of the forward and rearward blades may be upwardly or downwardly tipped relative to the mounting beam 16 by manipulation of the mounting bolts 28 and 45 extended through their respective slots 26–27 and 43–44 and the apertures 19 in the beam.

A plurality of substantially rigid V-shaped auxiliary blades 55 are operationally associated with the forward and rearward flexible blades 22 and 24. As best shown in FIG. 6, each of the auxiliary blades 55 provides a pair of opposite right-angularly related wing portions 56 and 57 having angularly related leading cutting edges 58 and 59, respectively. An integral mounting member 60 having a leading cutting edge 61 upwardly extends from the apex of the wings in a plane aligned with the bisector of the angle formed between the wings. As best shown in FIGS. 3 and 4, the wings also rearwardly upwardly diverge from their apex adjacent to the mounting member 60. A pair of elongated slots 62 are formed in the mounting member adjustably to align with the mounting holes 35, 52 and 53 in their respective ends 32, 48, and 50 of the flexible blades to receive a plurality of fastening bolts 64 therethrough. When mounted as described, the adjacent wings of the stabilizing blades on the rearward flexible blade overlap sufficiently to cut a continuous path outwardly of the beam 16 and in a plane beneath the flexible blades 22 and 23. To prevent the occurrence of ridges, the mounting member 60 on the forward auxiliary blade 22 is aligned with the adjacent edges of the wings on the stabilizing blades on the rearward flexible blade 23. The elongated mounting slots 62 in the mounting member 60 of the auxiliary blades permit the blades to be positioned in angularly downwardly disposed relation with their respective flexible blades.

The weeder blades 22 and 23 and the auxiliary blades 55 may also be provided in a second form of the present invention, as shown in FIGS. 8, 9, and 10, without deviating from the scope of the claims presented herewith. This form provides spaced forward and rearward flexible weeder blades generally indicated at 70 and 71, respectively, which are individually connected to the forward and rearward ends of the mounting beam 16 in a somewhat similar manner as the weeder blades 22 and 23 of the first form. The weeder blades 70 and 71 are substantially identical and are provided with substantially flat edgeward earth scraping blades 72 composed of single sheets of spring steel material having inner mounting ends 73 bolted to their respective ends of the tool beam by way of elongated, right angularly related, slots 74 and 75. The slots are adjustably aligned with the apertures 19 in the beam individually to receive fastening bolts 76. The blades taper longitudinally of their length outwardly of their inner ends 73 to angle downwardly and thence outwardly in a dog leg configuration to terminate in angulated outer ends 78 disposed in substantially parallel relation to the beam 16.

The weeder blades 70 and 71 individually include auxiliary or slicing blades 80 associated therewith, each providing an inner mounting end 82 congruently underlying the inner end 73 of its respective scraping blade 72. The slicing blades taper longitudinally outwardly of their inner ends and extend obliquely rearwardly from their scraping blades to terminate in outer cutting portions 84. The cutting portions 84 extend in substantially horizontal planes parallel and somewhat below the edge of the scraping blades 72. The cutting portions 84 provide upturned end portions 85 which are adapted to engage their respective scraping blades during severe rearward flexing thereof incident to plant engagement.

*Operation*

The operation of the described embodiments of the subject invention is believed to be readily apparent and is briefly summarized at this point. When adapting the weeder of either form of the present invention to the disc harrow 11, the beam 16 is rigidly secured thereto in a position to insure earth engagement of the outer ends 29, 46 and 78 of the flexible weeder blades 22, 23, 70 and 71. The weeder blades may then be individually elevationally adjusted to the desired depth by the manipulation of the mounting bolts 28, 45 and 76 extended through the apertures 19 in the beam by way of their respective elongated slots 26–27, 43–44 and 74–75. Also, the auxiliary blades 55 of the first form are angularly adjusted with respect to their respective flexible blades so as to provide a minimum of drag when in earth engagement, but angled sufficiently to cause the upper surface thereof to react against the flow of earth therepast to provide a downward force on the flexible weeder blades. With such arrangement, the downward force or draft created by the upper surface of the auxiliary blade insures ground engagement of the flexible weeder blades 22 and 23 at all times during operation. Although the weeder 10 is shown adapted to only one side of the disc harrow 11, it is readily apparent that such structure may be mounted on the opposite side as well. As shown in FIG. 7, the blades are easily inverted to a position on the opposite side of the mounting beam 16. This is accomplished by the mounting apertures 26–27 and 43–44 of the blades which are adapted to provide the same degree of adjustability when mounted on either side of the mounting beam.

As previously described in my co-pending application, the blades are drawn closely adjacent to the rows of plants 12. During such movement, the outer ends 29 and 46 thereof are permitted to flex rearwardly past the stalks or trunks of the plants 12 during which travel the blades are effective to remove substantially all the weeds around the plants in their edgeward scraping or soil compressing action depending on soil condition. Depending on the age and rigidity of the plants being cultivated, the flexibility of the weeder blades can be easily modified by either removing or inserting a greater number of the laminated sheets 24 and 40 within each of the forward and rearward blades 22 and 23. As previously noted, the auxiliary blades 55 are effective to urge and to maintain the outer ends of the flexible blades in earth engagement. Furthermore, the auxiliary blades maintain such engagement even when the more stubborn weeds having extensive root systems are encountered, which normally would cause the flexible weeder blades to slide over the weeds and be lifted out of ground engagement. It is readily apparent that while the auxiliary blades are effective to sever the roots of weeds encountered closely adjacent to the rows of crops the auxiliary blades flex rearwardly with their respective flexible blades so as not to engage the roots of the crops. Further, the flexing action of the blades 22 and 23 impart a greater efficiency to the V-shaped cutting edges of the auxiliary blades than attainable with a rigid mounting. For example, if the forward edge 59 engages an obstruction, such as a tough tap root of a weed, the rearward drag which results causes the auxiliary blade to flex rearwardly of the weeder blade 22 or 23 on which it is mounted. This increases the angle of the edge 59 relative to the direction of travel and enhances the slicing effect to insure a dependable weeding action. Similarly, when such an obstruction is engaged by a cutting edge 58, a twisting effect is imparted to its respective auxiliary blade. This tends to flex forwardly the outer end of its respective mounting blade 22 or 23, increases the angularity of the edge 58 with respect to the direction of travel and enhances the slicing effect similarly to achieve improved weeding action.

In the second form of the present invention, the weeder blades 70 and 71 are drawn along the row of plants 12 as before with the scraping blades 72 and the slicing blades 80 independently rearwardly flexing incident to the forward movement of the implement. The blades are able to flex further rearwardly incident to engagement with the trunks or stalks of the plants 12 with which they may come in contact upon inadvertent transverse movement of the implement from its normally straight path of travel. In harder soils, however, it is desirable to position the implement closer to the rows in order that the weeder blades are disposed in interfering relation with the plants. With such positioning, the blades flex around and past each plant encountered physically to remove the weeds between the plants. As such flexing occurs, the outer ends 78 of the scraping blades are positioned against the cutting portion 84 of the slicing blades 80 for concurrent rearward flexing thereof. The scraping blades thereby provide the dual function of partially masking the cutting portion of the slicing blades to preclude engagement of the cutting portion thereof with the plant. As in the first form, the scraping blades 72 are primarily adapted edgewardly to scrape against the soil to remove weeds therefrom while the slicing or auxiliary blades function to sever roots and the like below the edges of the scraping blades.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a weeding tool, the combination of a transversely substantially flat elongated flexible blade having an edge, a substantially flat auxiliary blade, means interconnecting said blades with the flexible blade disposed in substantially right-angular relation to the flat blade and with the flat blade in substantially parallel spaced relation to the edge of the flexible blade, and means connected to the flexible blade mounting said blade for earth traversing movement along a line of travel oblique thereto with the flexible blade in edgeward earth engagement and transversely substantially vertically disposed and with the flat blade substantially horizontally disposed in following relation to the flexible blade and spaced downwardly from the lower edge thereof.

2. In a weeding tool, the combination of an elongated longitudinally flexible transversely substantially flat mounting blade having a transversely disposed longitudinally extended edge, means mounting said blade in transversely erect edgeward earth engagement for earth traversing movement in a direction oblique thereto and rearward flexing incident to obstruction engagement, and a substantially flat auxiliary blade mounted on the mounting blade in substantially parallel relation to said edge of the mounting blade and downwardly spaced therefrom for earth engagement in following relation thereto.

3. A weeding tool comprising an elongated, longitudinally flexible, transversely substantially flat, mounting blade having a transversely disposed longitudinally extended edge; means connected to the mounting blade with an end of the blade extended therefrom and mounting said blade for earth traversing movement in transversely substantially vertical attitude with said edge in earth engagement and longitudinally extended obliquely to the direction of travel for rearward flexing of said extended end; and an auxiliary blade mounted on the mounting blade having a cutting portion disposed in a plane substantially parallel to said edge of the mounting blade and disposed below and rearwardly thereof for earth engagement.

4. A weeding tool comprising an elongated, longitudinally flexible, transversely substantially flat, mounting blade having a transversely disposed longitudinally extended edge; means connected to an end of the mounting blade and mounting said blade for earth traversing movement in a transversely substantially vertical attitude with said edge in substantially horizontal earth engagement and longitudinally extended from the mounting means rearwardly obliquely to the direction of travel for rearward flexing of the extended end; a substantially flat V-shaped auxiliary blade; and means mounting the auxiliary blade on the mounting blade with the apex thereof forwardly disposed and in a plane substantially parallel to said edge of the flexible blade and positioned below and rearwardly thereof for earth engagement.

5. A weeding tool for destroying weeds close to plants arranged in rows comprising an elongated tool beam adapted for earth traversing movement in a predetermined forward direction of travel lonigtudinally substantially parallel to such rows of plants; a pair of elongated, transversely substantially flat, longitudinally resiliently flexible earth penetrating blades mounted in transversely erect longitudinally angularly outwardly extended relation from said tool beam in edgeward earth engagement; and a plurality of auxiliary earth penetrating blades individually mounted on said flexible blades in following relation thereto, and said auxiliary blades having cutting edges facing in said forward direction of travel to sever weeds below said flexible blades for easier removal thereby.

6. A weeding tool for destroying weeds close to plants arranged in rows comprising a tool beam mounted for earth traversing movement in a predetermined forward direction of travel longitudinally along such rows of plants, an elongated, transversely substantially flat, longitudinally resiliently flexible earth penetrating blade mounted in angularly outwardly extended relation from said tool beam in oblique angular relation to said direction of travel and in edgeward earth engagement; and a plurality of substantially rigid earth penetrating blades mounted in substantially horizontal position on said flexible blade and below the same, said rigid blades each having a pair of opposite angularly rearwardly extended wing portions each with adjacent wings of adjacent blades overlapping in coplanar relation aligned with said forward direction of travel to cut a continuous swath through the earth outwardly of the tool beam.

7. In an earth working implement adapted to be carried on an earth traversing vehicle in a predetermined forward direction of travel for cultivating in close proximity to crops arranged in rows; the combination of an elongated tool beam; means mounting the tool beam on said vehicle in substantially aligned relation with said predetermined forward direction of travel longitudinally of the row of crops; a pair of transversely substantially flat, longitudinally resiliently flexible, earth penetrating blades having inner and outer end portions; means individually mounting the inner end portions of the blades on the tool beam in spaced relation longitudinally of the beam with the blades angularly rearwardly outwardly extended therefrom in substantially parallel relation to each other and in edgeward earth engagement whereby during movement of the blades through the earth adjacent to the row of crops, the blades flex rearwardly incident to engagement with the crops and slide therepast; and a plurality of substantially horizontal, flat rigid, earth penetrating blades mounted on said flexible blades rearwardly and below said flexible blades and having cutting edges facing in said forward direction of travel to sever weeds below the flexible blades for easier removal thereby and to provide planar movement through the earth to maintain said flexible blades in earth engagement.

8. In an earth working implement adapted to be carried on an earth traversing vehicle in a predetermined forward direction of travel for cultivating in close proximity to row crops; the combination of an elongated tool beam; means adjustably mounting the tool beam on said earth working implement in aligned relation with said predetermined forward direction of travel longitudinally of the row of crops; a pair of forward and rearward, transversely substantially flat, longitudinally resiliently flexible, blades having inner and outer end portions, each of said blades including a plurality of laminated sheets of spring material superimposed in congruent relation at said inner ends of the blades and terminating in longitudinally spaced successively longer outer ends, at least one of said inwardly disposed ends on each blade being angulated and secured flatly against the beam, substantially aligned with said predetermined forward direction of travel and with the blades in edgeward earth engagement; substantially rigid earth penetrating blades mounted in depending relation from said angulated ends of the sheets, said rigid blades having a pair of opposite angularly related wing portions extended rearwardly from said flexible blades in a substantially horizontal plane right angularly related to said flexible blades, and said wing portions of said rigid blades overlapping each other in said forward direction of travel for coplanar movement in a continuous path through the earth beneath said flexible blades, said rigid blades flexing with said flexible blades around crops engaged thereby to maintain the flexible blades in earth engagement during such flexing movement.

9. In an earth working implement adapted to be motivated in earth traversing movement in a predetermined forward direction of travel for cultivating in close proximity to plants arranged in rows; the combination of a tool beam; means mounting the tool beam for earth traversing movement longitudinally of the row of plants and in substantial alignment with the direction of such movement; transversely substantially flat, longitudinally resiliently flexible, earth penetrating blades; means mounting the blades on the tool beam in spaced relation longitudinally of the beam with the blades angularly rearwardly outwardly extended therefrom in substantially parallel relation to each other, transversely in substantially upright planes, and in oblique angular relation to said direction of movement whereby during movement of the blades through the earth adjacent to the rows of plants the blades flex rearwardly incident to engagement with the plants and slide therepast; and auxiliary blades mounted on the flexible blades and rearwardly extended therefrom having earth engaging portions lying in planes below the flexible blades and substantially normal to said upright planes of the flexible blades for planar movement through the earth to stabilize the flexible blades in edgeward earth engagement, said earth engaging portions of the auxiliary blades each providing cutting edges in opposite oblique angular relation to said forward direction of movement to sever roots of weeds encountered by said flexible blades, and being movable with the flexible blades during said rearward flexing thereof to pass around plant roots and to decrease the angularity of said cutting edges with respect to said forward direction of travel to increase their slicing effect against the roots of weeds encountered thereby.

10. In an earth working implement adapted to be motivated in earth traversing movement in a predetermined forward direction of travel for cultivating in close proximity to plants arranged in rows; the combination of a tool beam; means mounting the tool beam for earth traversing movement longitudinally of the row of plants; a pair of transversely substantially flat, longitudinally resiliently flexible, earth penetrating blades having inner and outer end portions; means individually mounting the inner end portions of the blades on the tool beam in longitudinally spaced relation to each other with the blades angularly rearwardly outwardly extended therefrom in transversely erect substantially parallel relation to each other, the outer end portions of the blades lying in a common upright plane aligned with said direction of travel whereby during movement of the blades through the earth adjacent to the rows of plants, the blades flex rearwardly incident to engagement with the plants and slide therepast; and a plurality of substantially rigid earth penetrating blades mounted on said flexible blades in rearward extension therefrom having earth engaging portions disposed in depending right-angular relation to said flexible blades for planar movement through the earth to stabilize the flexible blades in edgeward earth engagement, said earth engaging portions of the rigid blades each having cutting edges disposed in opposite obliquely angularly facing relation to said forward direction of movement to sever roots of weeds encountered by said flexible blades, and being movable with the flexible blades during said rearward flexing thereof to pass around plant roots and to decrease the angularity of said cutting edges with respect to said forward direction of travel to increase their slicing effect against roots of weeds encountered thereby.

11. A weeding tool comprising a tool beam adapted for earth traversing movement in a predetermined forward direction of travel, a pair of substantially flat, longitudinally resiliently flexible scraping blades having transversely disposed longitudinally extended edges, means mounting said scraping blades on said tool beam in oblique orientation with said direction of travel and in transversely erect edgeward earth scraping engagement for rearward flexing of the scraping blades incident to obstruction engagement, and a pair of substantially flat auxiliary blades individually rearwardly mounted on the scraping blades and having cutting portions disposed in substantially parallel, right angular, downwardly spaced relation to the edge of their respective scraping blades for rearward flexing incident to said rearward flexing of said scraping blades.

12. A weeding tool comprising an elongated longitudinally flexible, transversely substantially flat scraping blade having a transversely disposed longitudinally extended edge, means mounting said scraping blade in transversely erect edgeward earth scraping engagement for earth traversing movement in a direction oblique thereto and rearward flexing incident to obstruction engagement, and a substantially flat auxiliary blade mounted on the scraping blade in transversely erect position having a transversely disposed longitudinally extended cutting portion right angularly related to the edge of the scraping blade in a substantially horizontal plane positioned rearwardly and below said edge of the scraping blade, said scraping blade being engageable with the cutting portion of the auxiliary blade to preclude engagement of said cutting portion with the obstruction.

13. A weeding tool comprising a tool beam adapted for earth traversing movement in a predetermined forward direction of travel, a pair of forward and rearward substantially flat, longitudinally resiliently flexible, scraping blades having transversely disposed longitudinally extended edges and inner and outer end portions, said inner ends of the scraping blades being congruently mounted on said tool beam with their respective edges transversely outwardly extended therefrom in substantially vertically disposed attitude with their edges in earth scraping engagement and individually longitudinally rearwardly extended obliquely to the direction of travel for individually rearwardly flexing of their outer end portions, and an auxiliary cutting member forwardly extended from the outer end of said rearward blade in downwardly longitudinally spaced relation to said outer end of the forward scraping blade but engageable therewith upon obstruction engagement and rearward flexing of the forward scraping blade to preclude engagement of the rearward blade with the obstruction.

References Cited in the file of this patent

UNITED STATES PATENTS

| | | |
|---|---|---|
| 400,220 | Kilpatrick | Mar. 26, 1889 |
| 848,464 | Hippard | Mar. 26, 1907 |
| 1,184,856 | Johnson | May 30, 1916 |
| 2,311,353 | Shope | Feb. 16, 1943 |
| 2,777,379 | Heath | Jan. 15, 1957 |